United States Patent
Loewen et al.

(10) Patent No.: US 9,911,513 B2
(45) Date of Patent: Mar. 6, 2018

(54) PASSIVE SHUTDOWN SYSTEM AND METHOD OF OPERATING A LIQUID METAL COOLED REACTOR USING THE SAME

(71) Applicants: Eric Paul Loewen, Wilmington, NC (US); Weston Matthew Cundiff, Wilmington, NC (US); Pradip Saha, Wilmington, NC (US); Derek Bass, Wilmington, NC (US)

(72) Inventors: Eric Paul Loewen, Wilmington, NC (US); Weston Matthew Cundiff, Wilmington, NC (US); Pradip Saha, Wilmington, NC (US); Derek Bass, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 920 days.

(21) Appl. No.: 14/154,593

(22) Filed: Jan. 14, 2014

(65) Prior Publication Data
US 2015/0200021 A1    Jul. 16, 2015

(51) Int. Cl.
| | |
|---|---|
| *G21C 7/08* | (2006.01) |
| *G21C 7/22* | (2006.01) |
| *G21C 7/32* | (2006.01) |
| *G21C 9/027* | (2006.01) |
| *G21C 15/247* | (2006.01) |
| *G21D 3/06* | (2006.01) |
| *G21C 1/02* | (2006.01) |

(52) U.S. Cl.
CPC .............. *G21C 7/22* (2013.01); *G21C 7/08* (2013.01); *G21C 7/32* (2013.01); *G21C 9/027* (2013.01); *G21C 15/247* (2013.01); *G21D 3/06* (2013.01); *G21C 1/02* (2013.01); *Y02E 30/35* (2013.01); *Y02E 30/39* (2013.01)

(58) Field of Classification Search
CPC ... G21C 1/02; G21C 7/08; G21C 7/18; G21C 7/22; G21C 7/28; G21C 7/32; G21C 9/02; G21C 9/027
See application file for complete search history.

(56) References Cited

U.S. PATENT DOCUMENTS

| | | | | | |
|---|---|---|---|---|---|
| 3,375,170 | A | * | 3/1968 | Stubley | G21C 7/16 376/227 |
| 5,196,159 | A | * | 3/1993 | Kawashima | G21C 1/02 376/221 |
| 5,420,897 | A | * | 5/1995 | Kasai | G21C 1/02 376/220 |
| 8,295,427 | B1 | * | 10/2012 | Fuchs | G21C 7/10 376/327 |
| 2009/0016479 | A1 | | 1/2009 | Moen et al. | |

* cited by examiner

Primary Examiner — Sharon M Davis
(74) Attorney, Agent, or Firm — Harness, Dickey & Pierce

(57) ABSTRACT

A passive shutdown system for a liquid metal cooled reactor may include a tube and a neutron absorber within the tube. The tube may be configured to extend through a core of the liquid metal cooled reactor. The tube has an upper end and a lower end. The tube defines a flow path for a liquid metal coolant. The neutron absorber is a mobile structure configured to partially obstruct a flow of the liquid metal coolant within the flow path. A method of operating a liquid metal cooled reactor may involve the use of the passive shutdown system.

13 Claims, 6 Drawing Sheets

400

PASSIVE SHUTDOWN SYSTEM AND METHOD OF OPERATING A LIQUID METAL COOLED REACTOR USING THE SAME

BACKGROUND

Field

The present disclosure relates to protection systems and methods of using the same in a nuclear reactor.

Description of Related Art

In a conventional liquid metal cooled reactor, a high primary and secondary coolant flow rate (>90%) is established before bringing the reactor core to a critical state. To increase electrical power to the grid, the outlet of the core temperature is increased, thereby "pushing" more heat out of the power system. This method brings about two problems: expensive pumping loads at low power and large thermal variations during changes in reactor power (induces thermal stresses across the fluid system). These two issues inhibit the system's ability to responsively load follow as designed. These problems lead to higher O&M costs to the plant owner.

In particular, in a conventional liquid metal cooled reactor, temperature is increased to increase power output to the grid. There may be about a 175° C. temperature change when the reactor goes from 0 to 100% power. If the plant is used for load following, this will induce a large number of thermal cycles. Thermal cycles in sodium, also known as thermal stripping, cause unnecessary wear on metal components. Furthermore, at low power operations, the primary and secondary pumps must still operate at 100% flow, which consumes a great deal of power. For example when PRISM is operating at 100% power and 100% flow, the primary and secondary pumps consume approximately 7% of the reactor's electrical output. This percentage increases as reactor power is decreased because sodium flow must remain constant.

Nuclear reactors also use a variety of damage prevention/mitigation devices to prevent core damage. These devices typically center on a control system that senses a "problem" and then activates the protection system. An important aspect of risk mitigation is the prevention of core damage in the seconds after loss of primary coolant flow. A gas expansion module (GEM) is conventionally used to protect the core of a liquid metal cooled reactor in the event of pump failure. The GEM has two operating states: one where it is voided of sodium (without flow) and one where it is full of sodium (at high flow). The GEM is an inverted tube filled with helium gas to a specific density. The GEM communicates with the core inlet plenum (the highest pressure point in the system). Without pump flow, the gas expands almost to the bottom of the GEM creating a voided assembly at the outside of the core. During plant startup, pumps are energized to provide flow to remove fission heat. The high pressure coolant in the inlet plenum compresses the gas in the GEM filling most of it with sodium, thereby reducing neutron leakage from the core by reflection of the neutrons. The GEM can have reactivity effects on the core if the helium gas is not compressed high enough in the GEM. The issue requires the primary coolant flow to be established at or above 90% rated flow. A filled GEM at this core flow will not induce power oscillations with normal flow oscillations. If the pumps turn off, for any reason, the compressed gas expands and reestablishes the void. This increases the neutron leakage which inserts negative reactivity. This negative reactivity brings the reactor to a subcritical state.

BRIEF DESCRIPTION OF EXAMPLE EMBODIMENTS

A method of operating a liquid metal cooled reactor may include a flowing step and a controlling step. The flowing step may include flowing a liquid metal coolant at a flow rate through a core of the liquid metal cooled reactor via a tube that contains a neutron absorber therein. The tube may be longer than an active region of the core. The tube includes an upper end and a lower end. The upper end of the tube is above the active region of the core. The lower end of the tube is below the active region of the core. The tube defines a flow path for the liquid metal coolant. The neutron absorber is a mobile structure within the flow path. The controlling step may include controlling a power output of the liquid metal cooled reactor based on the flow rate of the liquid metal coolant through the tube. The tube is configured such that the liquid metal coolant enters the flow path through the lower end of the tube and is guided upward past the neutron absorber to exit from the upper end of the tube. A position of the neutron absorber within the flow path is dependent upon the flow rate of the liquid metal coolant through the tube.

A passive shutdown system for a liquid metal cooled reactor may include a tube and a neutron absorber within the tube. The tube may be configured to extend through a core of the liquid metal cooled reactor. The tube has an upper end and a lower end. The tube defines a flow path for a liquid metal coolant. The neutron absorber is a mobile structure configured to partially obstruct a flow of the liquid metal coolant within the flow path.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
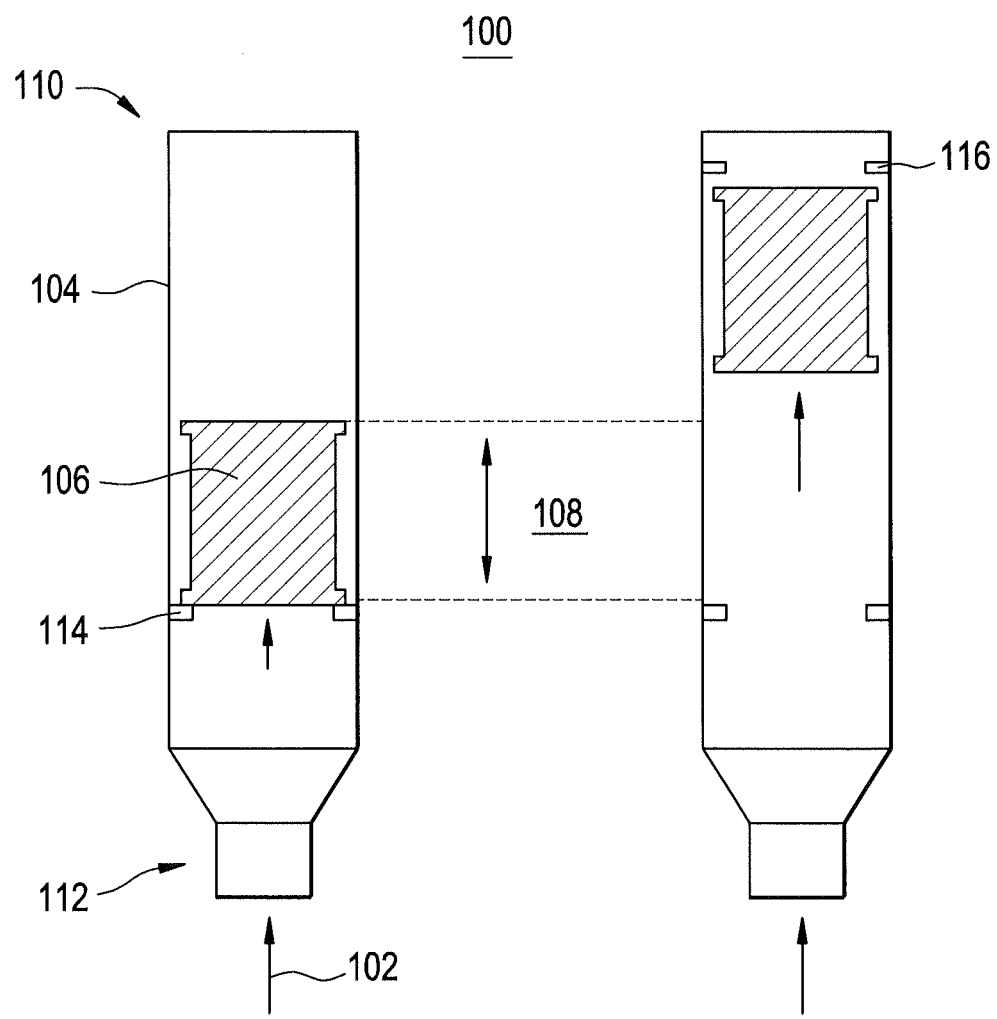
FIG. 1 is a cross-sectional view of a passive shutdown system for a liquid metal cooled reactor according to a non-limiting embodiment of the present disclosure.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the teen "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In an example embodiment, the present disclosure relates to a method for flow and control rod adjustments to control reactor power in liquid metal fast reactors. Most expenses connected to nuclear power are due to operations and maintenance (O&M) and fuel costs. O&M is typically higher than fuel costs. Improving O&M margins may make nuclear power more competitive in the market place. A passive shutdown system for a nuclear reactor pump trip may be used to allow liquid metal fast reactors to operate at a relatively constant core outlet temperature, thereby allowing the reactor power to be controlled through core flow and control rods adjustments (similar to a boiling water reactor (BWR)). The new method herein reduces O&M costs by reducing extreme temperatures gradients in the system thereby reducing thermal stresses induced by these temperature gradients (less maintenance) and reducing pumping power required at lower reactor power levels (less power consumption therefore more electricity for sale). A passive loss of flow device may be installed that does not affect reactivity after a certain flow rate is established. Once this device is installed the operator now has the freedom to change flow as well as control rods to control reactor power.

Conventional methods require a relatively high flow (90%-100%) regardless of reactor power. In particular, in conventional PRISM control methods and those reactor designs preceding it, the reactor power was controlled by allowing the temperature difference between reactor inlet and outlet temperature to change, since flow rate was held constant. Such an approach is represented below by the following expression.

$$Q = \frac{\dot{m}\Delta\hat{T}}{R}$$

In contrast, a method according to an example embodiment involves holding the temperature difference as close to constant as possible while moving control rods and/or changing mass flow rate to change reactor power. This method has the advantage of reducing the thermal cycling present in plant components during load following operations (reactor power being changed frequently). The present approach is represented below by the following expression.

$$Q = \frac{\dot{\hat{m}}\Delta T}{R}$$

The present method allows the reactor system to be operated at a constant coolant temperature. Pumping flow and control rods adjustments may be used solely to "transport" more energy out of the system. This method moves reactor control from "pushing" heat out by increasing coolant temperature to "transporting" fission heat out through changes in core flow. Pump flow will follow reactor power to maintain a constant coolant temperature. Pumping power consumption is reduced at low reactor power. This will also reduce thermal stress across the IHX, pump inlets & outlets, and steam generator tube sheet. A metal cooled fast reactor may be made better at load following than a LWR. In sum, the technical advantages may include reducing pumping power, increasing component lifetimes due to mitigated thermal fatigue, improving load following capabilities of a PRISM power block, decreasing flow/erosion wear at low operating power levels, and improving matching of power to flow for core stability. The commercial advantages may include less O&M costs for the customer, less pumping power costs to the customer, faster response to load changes on the grid, more sales of PRISM reactors by offering operation flexibility and commercial advantages, and more operational flexibility.

In another example embodiment, the present disclosure relates to a passive shutdown system for a nuclear reactor pump trip. The system will help solve the issue of fuel damage during a loss of flow event in a liquid metal cooled reactor while reducing thermal stresses in the primary loop, secondary loop, and across the steam generator tube sheet. Although metal cooled reactors (e.g., sodium cooled reactors) are discussed herein, it should be understood that the system may be used in other reactor designs. The system couples core differential pressure, gravity, neutron absorption, and reactor physics to insert negative reactivity into the core to bring the reactor to a safe, subcritical state. After the primary pumps trip (unexpectedly stops pumping fluid) the gravity assisted neutron absorber is lowered into the core and reactor physics show that the fission chain reaction will be stopped, thereby reducing the heat production to that solely of decay heat. Unlike a GEM design, the primary system is not required to be at 90% core flow for criticality to be sustained. This allows the plant operator to match reactor power to core flow, thereby reducing the amount of thermal stress across the entire fluid system. The system reestablishes its functionality after a loss of flow event by simply reestablishing primary pump flow.

As previously noted, a known hazard to operating fast reactor cores is the loss of flow leading to fuel melting since power generation continues without the coolant for heat removal. The hazard may be mitigated or prevented by directly and immediately detecting a loss of flow, and then inserting negative reactivity, so that the reactor power in that area is instantly reduced. Such mitigation or prevention may be achieved with a passive shutdown system that uses a neutron absorber in the form of a float structure. Using a force balance and the equation for drag force, the following expression may be used to determine the required flow rate to lift the float structure.

A force balance on float gives $$F_d + \rho_l V_f \frac{g}{g_c} = \rho_f V_f \frac{g}{g_c}$$

Drag force is expressed by $$F_d = C_d A_f \frac{\rho_l u_m^2}{2 g_c}$$

Combining the previous two equations you can determine the required flow rate to move the float.

$$u_m = \left[\frac{1}{C_d} \frac{2 g V_f}{A_f}\left(\frac{\rho_f}{\rho_l} - 1\right)\right]^{1/2}$$

$$Q = A u_m = \frac{\pi}{4}[(D + ay)^2 - d^2]\left[\frac{1}{C_d} \frac{2 g V_f}{A_f}\left(\frac{\rho_f}{\rho_l} - 1\right)\right]^{1/2}$$

The descriptions of the above variables are found in the following table.

| Variable | Description |
| --- | --- |
| A | Annular flow area |
| $A_f$ | Frontal area of float |
| a | Constant describing tube taper |
| $C_d$ | Drag coefficient |
| D | Entrance diameter of tube |
| d | Max float diameter |
| $F_d$ | Force of drag |
| g | Acceleration of gravity |
| Q | Liquid flow rate |
| $u_m$ | Mean flow velocity |
| $V_f$ | Volume of float |
| y | Vertical distance of float in tube |
| $\rho_f$ | Density of float |
| $\rho_l$ | Density of liquid |

In a non-limiting embodiment, the float may have a mass of 15.8 kg, a volume of 2780 cm$^3$, and thus a density ($\rho_f$) of 5683 kg/m$^3$. Thus, the float may have a lower density than that of pure iron. The liquid may have a density ($\rho_l$) of 846 kg/m$^3$. As a result, the ratio ($\rho_f/\rho_l$) of the float density to the liquid density may be about 6.72, although example embodiments are not limited thereto.

The float (also referred to herein as a neutron absorber or absorbing material) may be housed within a tube of the passive shutdown system. A sodium flow may enter the tube through a nose piece. During low flow conditions, the drag force of the fluid on the float is not great enough to move the float. The flow path defined by the tube may be tapered, which helps drive the fluid and prevents the float from falling below the active region of the core. Alternatively, the flow path defined by the tube may be uniform. At higher flower conditions (e.g., >25%), the drag force of the fluid increases until the absorbing material is moved upward out of the active region of the core. Unlike a GEM, the float contains absorbing material, which produces some internal heating through the absorption of neutrons. Those skilled in the art will understand that the internal heat generation rate can be adjusted (with absorber mass and sodium flow) so that this passive shutdown device is in thermal equilibrium with its environment. Keeping this device close to thermal equilibrium with the core allows increases to the core's negative temperature feedback.

The top of the tube may have a spring that is configured to send a signal to the control room when compressed. This arrangement would inform the operator that the float with absorbing material is fully out of the core. With a large flow variation (decrease), the spring and gravity will force the absorbing device back into the core, thereby bringing the core to a subcritical state. The spring may also be used in connection with a latching mechanism to reduce flow induced vibrations on the absorbing material (wherein such vibrations may potentially cause reactivity changes in the core or unnecessary wear within the system).

The amount of flow and thus drag force required to move the absorbing material out of the active core region can be controlled by controlling the mass of the absorbing material (i.e., a heavier device will require a larger pressure force and therefore a higher sodium flow rate than a lighter device). In a non-limiting embodiment, a core flow less than 10% (or a differential pressure of 10 PSID) will not lift the absorbing material. When core flow exceeds 25% rated core flow, the device is fully "positioned" or "latched" if a latching mechanism is used. At this point, reactor criticality can be accomplished. Control rods are withdrawn until criticality is achieved. The present set up allows for more operation flexibility and less thermal stresses in the fluid system during start-up by having a much lower initial core flow requirement. The start-up sequence can now be controlled by using rods and core flow similar to a LWR.

During power operation, the float device or absorbing material does not affect the operation of the reactor, because the core flow is maintained significantly above 25% core flow, thereby keeping the float device in a position ready to insert into the core.

In the event of loss of primary flow, the force of drag on the float device will rapidly decrease. This decrease will drive the absorbing material into the core and will cause a negative reactivity insertion similar to that of a control rod being inserted. This negative reactivity insertion will bring the reactor to a safe, subcritical state, thereby preventing fuel damage even in the event of loss of flow.

In sum, the technical advantages of the present system may include the mitigation or prevention of core damage, passive activation, in-core flow protection, an ability to communicate that the system is in standby mode, an ability to be in thermal equilibrium with the surrounding core components because of internal heating, and the ability to match flow and power, which allows for greater operational flexibility. Additionally, the commercial advantages may include an improvement in the robustness of a metal cooled reactor and a reduction in the O&M costs of operating a metal cooled reactor. Example embodiments of the present disclosure are discussed below in further detail in connection with the accompanying drawings.

FIG. 1 is a cross-sectional view of a passive shutdown system for a liquid metal cooled reactor according to a non-limiting embodiment of the present disclosure. Referring to FIG. 1, the passive shutdown system 100 includes a tube 104 and a neutron absorber 106 within the tube 104. The tube 104 is configured to extend through a core of the liquid metal cooled reactor. The tube 104 has an upper end 110 and a lower end 112. The tube 104 may be a hollow, cylindrical structure. The lower end 112 of the tube 104 may be constricted so as to be in a form of a nose piece. The tube 104 defines a flow path for a liquid metal coolant 102. The neutron absorber 106 has a higher density than the liquid metal coolant 102. The tube 104 may extend vertically from the upper end 110 to the lower end 112.

The tube 104 may be configured to preclude the neutron absorber 106 from passing through the upper end 110 and the lower end 112 of the tube 104. For instance, the tube 104 may be configured to preclude a top surface of the neutron absorber 106 from passing below an active region 108 of the core. In particular, a lower stop 114 may be disposed on an inner surface of the tube 104. The lower stop 114 is configured to allow the flow of the liquid metal coolant 102 to pass through and to support a weight of the neutron absorber 106 when the flow of the liquid metal coolant 102 is insufficient to float the neutron absorber 106 within the flow path. The lower stop 114 may be aligned with a lower boundary of an active region 108 of the core. The lower stop 114 may be a ring-like band or ledge secured to the inner surface of the tube 104. Alternatively, the lower stop 114 may be in the form of one or more tabs (e.g., 3, 4) secured to the inner surface of the tube 104.

An upper stop 116 may also be disposed on an inner surface of the tube 104. The upper stop 116 is configured to allow the flow of the liquid metal coolant 102 to pass through while retaining the neutron absorber 106 within the tube 104. The upper stop 116 is also positioned within the tube 104 so as to allow the neutron absorber 106 to float completely above the active region 108 of the core when the reactor is in a critical state. The upper stop 116 may be a ring-like band or ledge secured to the inner surface of the tube 104. Alternatively, the upper stop 116 may be in the form of one or more tabs (e.g., 2, 3, 4) secured to the inner surface of the tube 104.

The neutron absorber 106 is a mobile structure configured to partially obstruct a flow of the liquid metal coolant 102 within the flow path defined by the tube 104. The neutron absorber 106 may have a nuclear cross-section of at least 2000 barns. A density ratio of the neutron absorber 106 to the liquid metal coolant 102 may range from about 1 to 4 (e.g., 1.5 to 4). The size of the neutron absorber 106 may sufficiently correspond to the size of the flow path defined by the tube 104 so as to prevent the neutron absorber 106 from engaging in a tumbling motion during the flow of the liquid metal coolant 102 through the tube 104. The height of the neutron absorber 106 may be at least the height of the active region 108 of the core.

Figure 2:
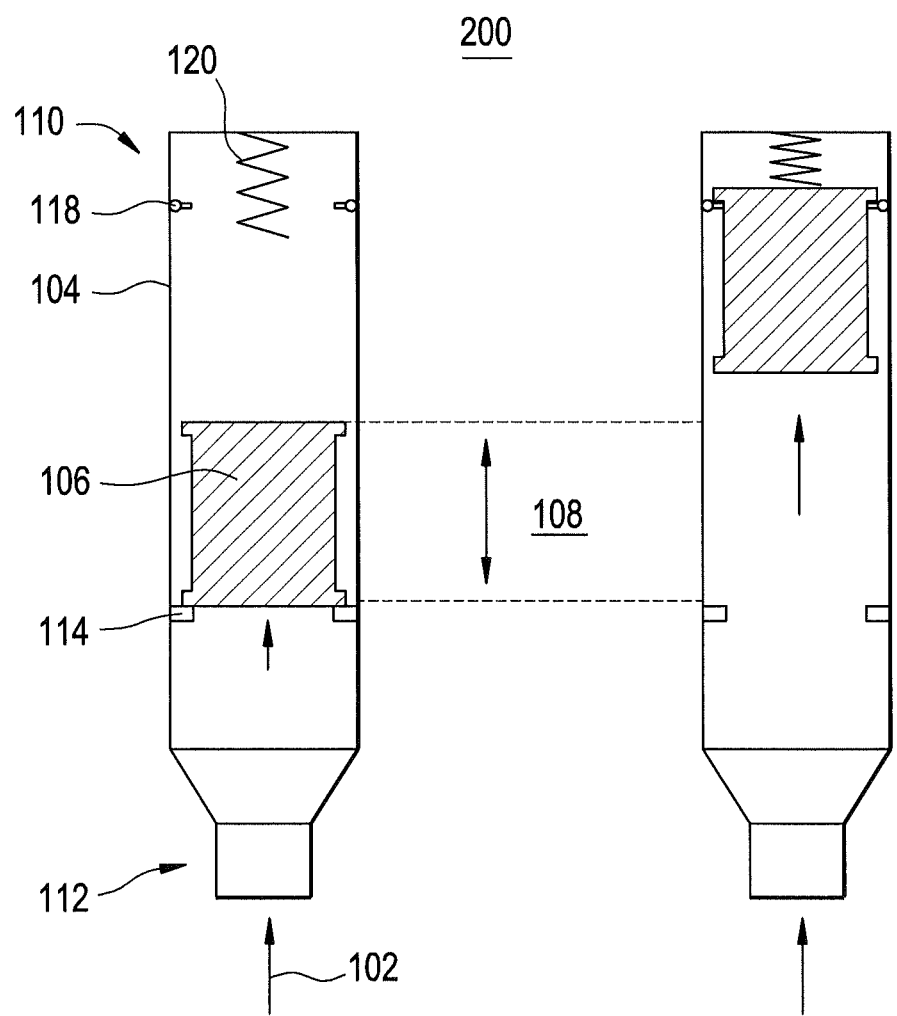
FIG. 2 is a cross-sectional view of a passive shutdown system for a liquid metal cooled reactor according to another non-limiting embodiment of the present disclosure.

FIG. 2 is a cross-sectional view of a passive shutdown system for a liquid metal cooled reactor according to another non-limiting embodiment of the present disclosure. Referring to FIG. 2, the passive shutdown system 200 includes a latch 118 at the upper end 110 of the tube 104. The latch 118 is configured to engage the neutron absorber 106 and reduce flow induced vibrations. A spring 120 is also disposed at the upper end 110 of the tube 104. The spring 120 is configured to trigger a signal when compressed by the neutron absorber 106. The signal may indicate to an operator that the neutron absorber 106 is out of the core. The other components shown in FIG. 2 may be as described in connection with FIG. 1.

Figure 3:
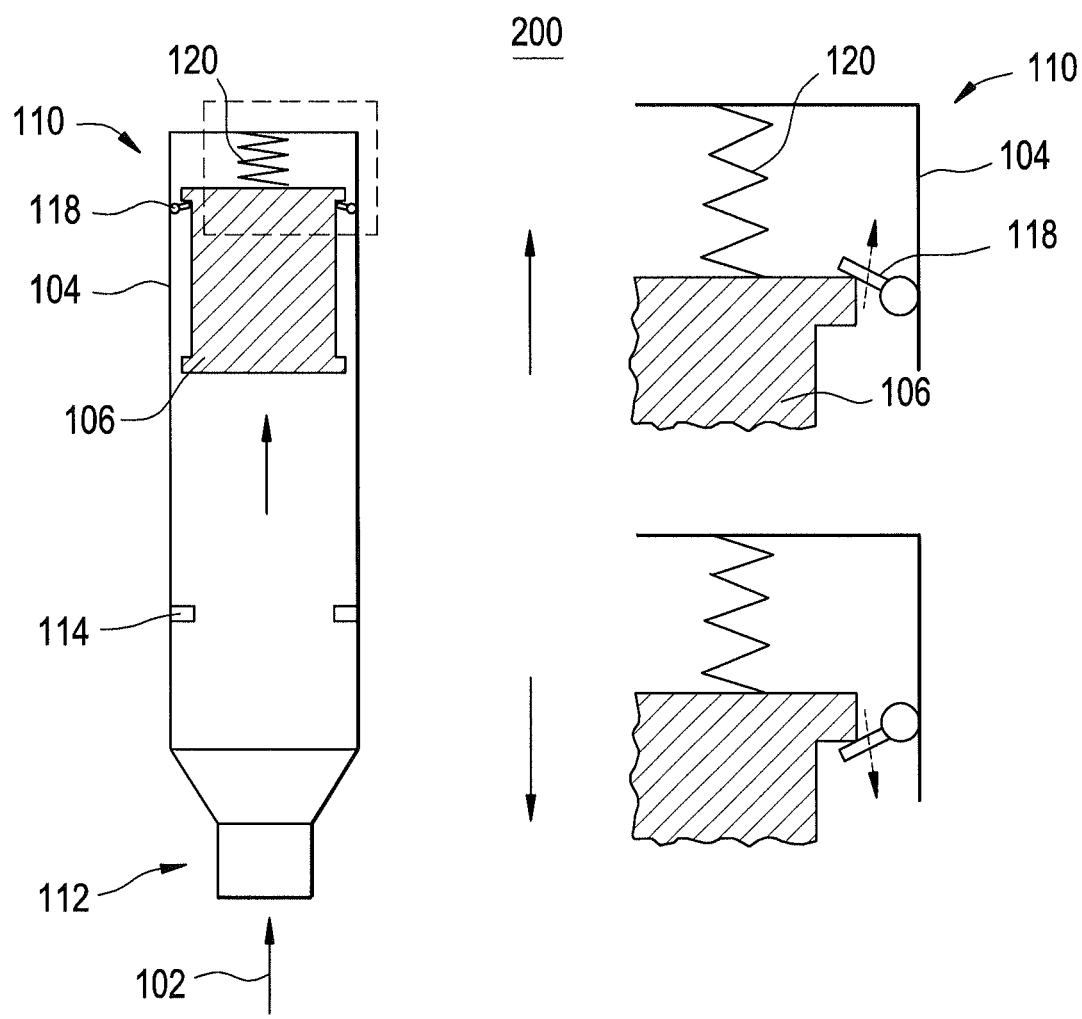
FIG. 3 is a cross-sectional view of an operation of a passive shutdown system in a liquid metal cooled reactor according to a non-limiting embodiment of the present disclosure.

FIG. 3 is a cross-sectional view of an operation of a passive shutdown system in a liquid metal cooled reactor according to a non-limiting embodiment of the present disclosure. In particular, FIG. 3 shows the operation of FIG. 2 in more detail. Referring to FIG. 3, at a higher flow of the liquid metal coolant 102, the neutron absorber 106 floats upward in the tube 104 and engages the latch 118 and compresses the spring 120. Once engaged, the latch 118 is designed to hold the neutron absorber 106 until the application of a sufficient downward force to release the latch 118. In FIG. 3, the sufficient downward force may be in the form of gravity and the compressed spring 120, although example embodiments are not limited thereto. The ability of the latch 118 to hold the neutron absorber 106 until the application of a threshold force allows the reduction or prevention of small upward and downward movements caused by small flow fluctuations. In the event of a loss of flow, the upward force of the liquid metal coolant 102 will no longer be present to overcome force of gravity and the spring 120 on the neutron absorber 106. As a result, the latch 118 will release the neutron absorber 106, and the neutron absorber 106 will come to rest on the lower stop 114, thereby placing the reactor in a subcritical state.

Figure 4:
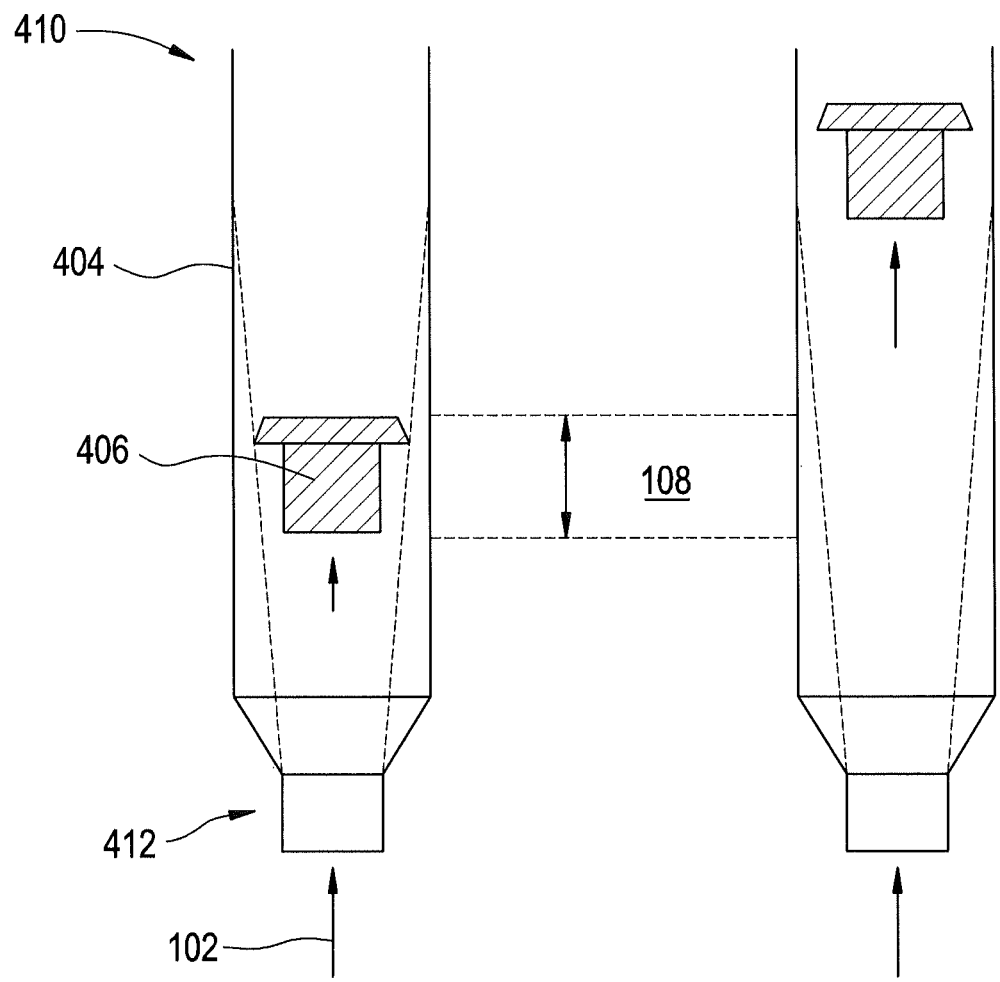
FIG. 4 is a cross-sectional view of a passive shutdown system for a liquid metal cooled reactor according to another non-limiting embodiment of the present disclosure.

FIG. 4 is a cross-sectional view of a passive shutdown system for a liquid metal cooled reactor according to another non-limiting embodiment of the present disclosure. Referring to FIG. 4, the passive shutdown system 400 includes a tube 404 and a neutron absorber 406 within the tube 404. The tube 404 is configured to extend through a core of the liquid metal cooled reactor. The tube 404 has an upper end 410 and a lower end 412. The lower end 412 of the tube 404 may be constricted so as to be in a form of a nose piece. The tube 404 defines a flow path for a liquid metal coolant 102. In FIG. 4, the flow path expands from the lower end 412 to the upper end 410. The neutron absorber 406 is shaped such that the top part is wider than the bottom part. The size of the top part of the neutron absorber 406 may be tailored so as to rest on a desired section of the flow path in the event of a loss of flow, wherein the desired section of the flow path may correspond to the active region 108 of the core.

Figure 5:
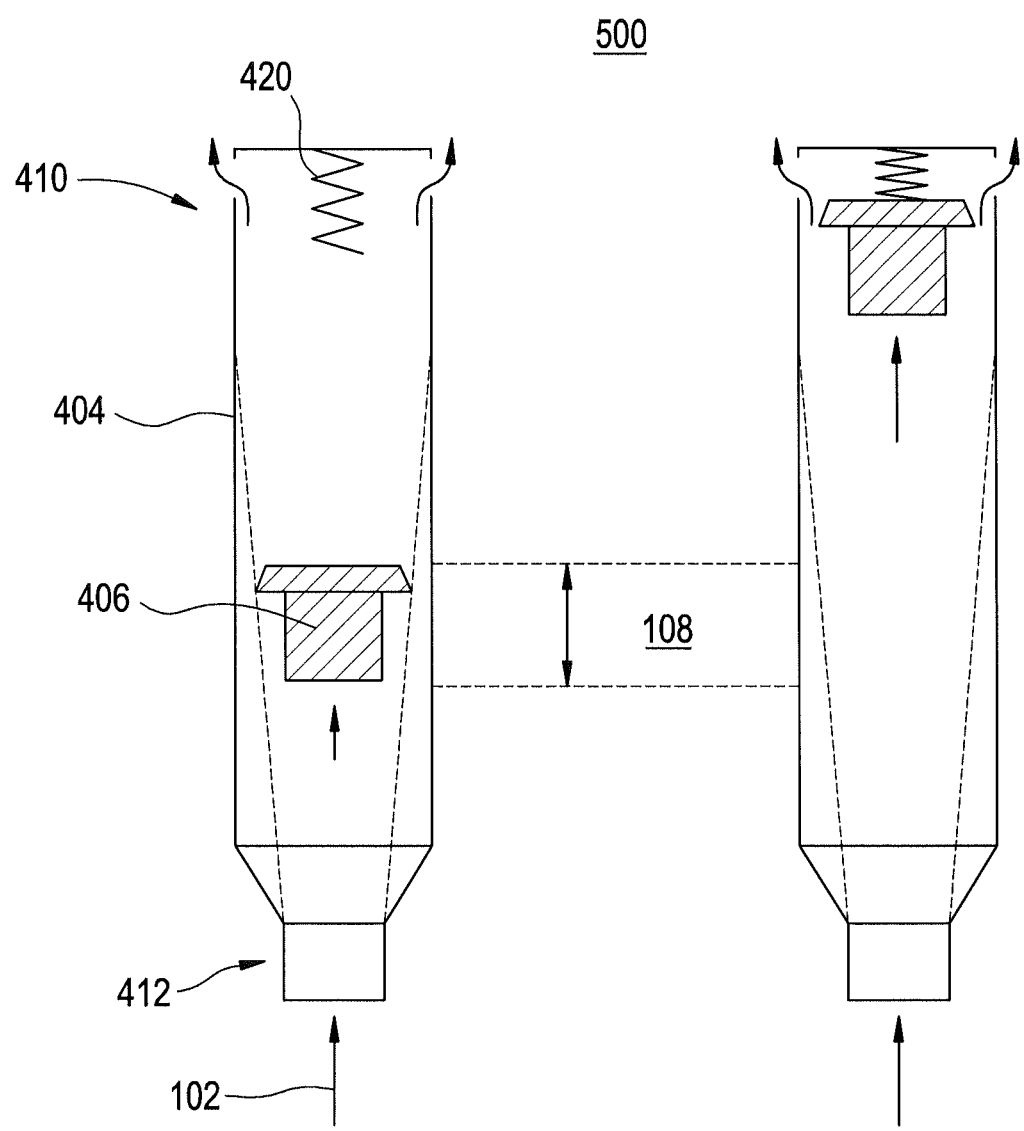
FIG. 5 is a cross-sectional view of a passive shutdown system for a liquid metal cooled reactor according to another non-limiting embodiment of the present disclosure.

FIG. 5 is a cross-sectional view of a passive shutdown system for a liquid metal cooled reactor according to another non-limiting embodiment of the present disclosure. Referring to FIG. 5, the passive shutdown system 500 includes a spring 420 at the upper end 410 of the tube 404. The spring 420 is configured to trigger a signal when compressed by the neutron absorber 406. The signal may indicate to an operator that the neutron absorber 406 is out of the core. The other components shown in FIG. 5 may be as described in connection with FIG. 4.

In view of the above, a method of operating a liquid metal cooled reactor may include flowing a liquid metal coolant at a flow rate through a core of the liquid metal cooled reactor via a tube that contains a neutron absorber therein. The tube may be longer than an active region of the core. The tube includes an upper end and a lower end. The upper end of the tube is above the active region of the core. The lower end of the tube is below the active region of the core. The tube defines a flow path for the liquid metal coolant. The neutron absorber is a mobile structure within the flow path. The method also includes controlling a power output of the liquid metal cooled reactor based on the flow rate of the liquid metal coolant through the tube. The tube is configured such that the liquid metal coolant enters the flow path through the lower end of the tube and is guided upward past the neutron absorber to exit from the upper end of the tube. A position of the neutron absorber within the flow path is dependent upon the flow rate of the liquid metal coolant through the tube.

The controlling step may include increasing the flow rate of the liquid metal coolant to increase the power output of the liquid metal cooled reactor. Conversely, the controlling step may include decreasing the flow rate of the liquid metal coolant to decrease the power output of the liquid metal cooled reactor. The controlling step may additionally include placing the liquid metal cooled reactor in a critical state when the flow rate of the liquid metal coolant is at least 15% of a rated flow for the liquid metal cooled reactor. The controlling step may also include maintaining an outlet temperature of the core at a constant level when the liquid metal cooled reactor is in a critical state. The controlling step may further include placing the liquid metal cooled reactor in a subcritical state when the flow rate of the liquid metal coolant is insufficient to float the neutron absorber within the flow path.

Figure 6:
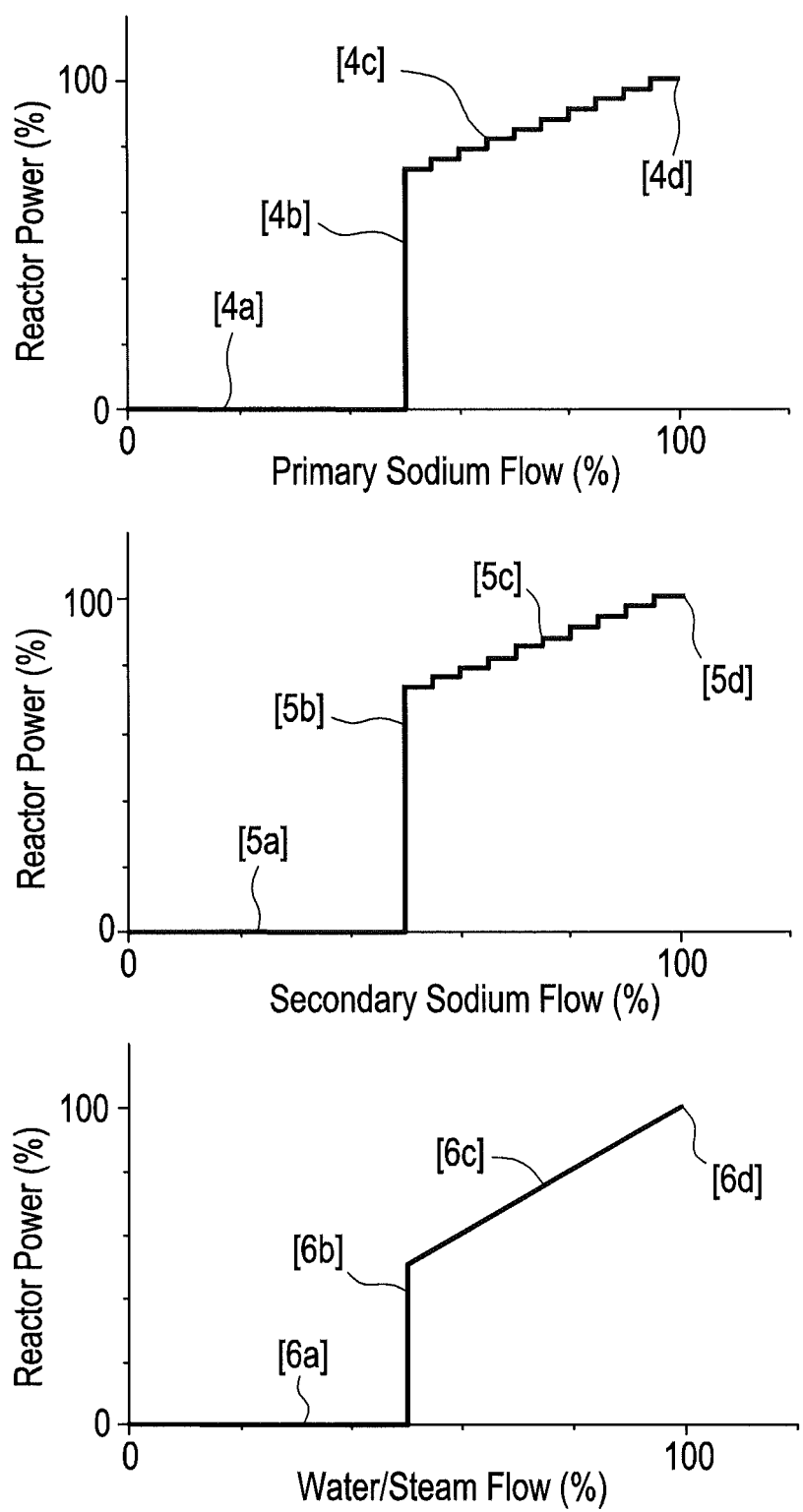
FIG. 6 shows the relationships between flow and reactor power according to a non-limiting embodiment of the present disclosure.

FIG. 6 shows the relationships between flow and reactor power according to a non-limiting embodiment of the present disclosure. The top graph of FIG. 6 shows primary sodium flow versus reactor power. Due to the presence of a passive shutdown device that initiates on low flow, there is a primary flow threshold value where the reactor cannot become critical (4a). After this threshold value is overcome, the reactor power may be ramped up at a constant flow rate (4b). This may be done by heating the sodium outlet temperature to the desired operating temperature. Once the desired operating temperature is obtained, a series of flow increases and control rod withdrawals may be performed to reach the desired operating power (4c). This allows 100% flow to correspond to 100% reactor power (4d).

The middle graph of FIG. 6 shows secondary sodium flow versus reactor power. The secondary sodium loop follows the primary flow loop. As the primary flow is changed, the secondary flow is changed as well. As shown in FIG. 6, the primary sodium flow rates depicted as regions 4a, 4b, 4c, and 4d of the top graph matches the secondary sodium flow rates depicted in regions 5a, 5b, 5c, and 5d of the middle graph.

The bottom graph of FIG. 6 shows water/steam flow versus reactor power. As mentioned above, there is a threshold flow rate value for which reactor power cannot be achieved (6a). As the reactor power is increased and the sodium loop is heated, the feedwater flow rate is held constant and the water temperature is heated until the desired super-heated steam generator outlet steam temperature and pressure is achieved (6b). The feedwater pumps are controlled by controlling the steam pressure to the turbine. To prevent changes in steam conditions the feedwater is increased as the reactor power and subsequent sodium flow rate is increased (6c). This allows 100% flow to correspond to 100% reactor power (6d). With the method discussed herein, metal cooled reactor operation may be advanced so as to be more economical and more favorable for rapid load following.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of operating a liquid metal cooled reactor, comprising:

flowing a liquid metal coolant at a flow rate through a core of the liquid metal cooled reactor via a tube that contains a neutron absorber therein, the tube being longer than an active region of the core, the tube including an upper end and a lower end, the upper end of the tube being above the active region of the core, the lower end of the tube being below the active region of the core, the tube defining a flow path for the liquid metal coolant, the neutron absorber being a mobile structure within the flow path, the neutron absorber having a single midsection between two end sections, a diameter of the midsection being less than a diameter of the two end sections; and controlling a power output of the liquid metal cooled reactor based on the flow rate of the liquid metal coolant through the tube, the tube configured such that the liquid metal coolant enters the flow path through the lower end of the tube and is guided upward past the neutron absorber to exit from the upper end of the tube, a position of the neutron absorber within the flow path being dependent upon the flow rate of the liquid metal coolant through the tube.

2. The method of claim 1, wherein the controlling includes increasing the flow rate of the liquid metal coolant to increase the power output of the liquid metal cooled reactor.

3. The method of claim 1, wherein the controlling includes decreasing the flow rate of the liquid metal coolant to decrease the power output of the liquid metal cooled reactor.

4. The method of claim 1, wherein the controlling includes placing the liquid metal cooled reactor in a critical state when the flow rate of the liquid metal coolant is at least 15% of a rated flow for the liquid metal cooled reactor.

5. The method of claim 1, wherein the controlling includes maintaining an outlet temperature of the core at a constant level when the liquid metal cooled reactor is in a critical state.

6. The method of claim 1, wherein the controlling includes placing the liquid metal cooled reactor in a sub-critical state when the flow rate of the liquid metal coolant is insufficient to float the neutron absorber within the flow path.

7. The method of claim 1, wherein the neutron absorber has a height that is at least equal to a height of the active region of the core.

8. The method of claim 1, wherein the neutron absorber has a nuclear cross-section of at least 2000 barns.

9. The method of claim 1, wherein the neutron absorber has a higher density than the liquid metal coolant.

10. The method of claim 1, wherein a density ratio of the neutron absorber to the liquid metal coolant ranges from about 1 to 4.

11. The method of claim 1, wherein the tube is constricted at the lower end with a tapering portion.

12. The method of claim 1, wherein the tube includes a lower stop on an inner surface of the tube between the upper end and the lower end.

13. The method of claim 1, wherein the neutron absorber includes a flange structure on a lower edge of the neutron absorber.

* * * * *